Patented July 6, 1926.

1,591,922

UNITED STATES PATENT OFFICE.

HANS KARPLUS, OF FRANKFORT-ON-THE-MAIN, GERMANY.

PROCESS OF IMPROVING ARTIFICIAL SILK, STAPLE FIBERS, AND TEXTILES MADE THEREWITH.

No Drawing. Application filed June 2, 1924, Serial No. 717,452, and in Germany January 11, 1924.

A disadvantage of the various kinds of artificial silk now on the market is that the firmness of the material is considerably lowered when the material is moistened due to its being composed of hydrated cellulose. According to Eschalier, the water resisting power of such artificial silk is increased by treating it with formaldehyde to which acid-reacting or de-hydrating substances are added. With this method the material becomes less readily colourable, less elastic and less flexible.

I have now found that the water-resisting properties of artificial silk articles are considerably increased without detriment otherwise, by treating the said articles with aldehydes, and more particularly with aqueous solutions of formaldehyde or vapours thereof in the presence of bases such as $KOH$, $NaOH$, $Ca(OH)_2$, $Ba(OH)_2$, $Mg(OH)_2$ and heating the material to a temperature preferably 120 to 170° C. Organic bases may also be used. Substances most suitable for fulfilling the purpose set forth are moreover alkaline reacting salts, and salts the basic component of which is a stronger base than the acid forming the acid component, such as for example alkali metal salts, alkaline earth metal salts (including magnesium salts) of acetic acid, formic acid, lactic acid, oxalic acid, tartaric acid, citric acid; also alkali metal salts of carbonic acid, boric acid and of hydrogen sulfide, alkali metal phosphate, etc. Particularly good results are obtained with an addition of alkali metal formates. Difficultly soluble addition substances may also be used. Finally, the best results can also be obtained by mixtures of several bases or several salts or mixtures of bases and salts.

The process may for example be carried into practice by impregnating the artificial silk articles with the above substances or with solutions or suspensions thereof, the said articles being thereafter subjected to the aldehyde treatment. They are for example treated with formaldehyde vapours, preferably with simultaneous heating or impregnating with an aqueous solution of formaldehyde or of substances which produce formaldehyde, for example solutions or suspensions of polymerization products of formaldehyde, the period of impregnation being between a few minutes and several days. The aldehyde treatment may precede the impregnation with the addition substances (salts, etc.) or they may be both carried out simultaneously, for example by dissolving or suspending the addition substances in the aldehyde bath.

The articles treated are heated in air, nitrogen or hydrogen for drying purposes until water-proof, the excess of impregnating liquid being previously removed if necessary.

Aldehydes or addition substances or both may be brought into contact with the artificial silk while the latter is in course of manufacture.

The water-resisting power and the sheen of artificial silk treated according to the process just described are considerably increased, while the material retains its softness and it can be readily dyed.

*Examples.*

1. Artificial silk is impregnated for several hours in a 30% aqueous solution of formaldehyde containing 1/10% of NaOH. The excess of impregnating liquid is thereafter pressed or centrifuged out of the material which is then heated to 140–150° C. by indirect steam for about 1 to 5 hours. The said material is then washed and finished in the known manner.

2. Artificial silk is impregnated in 40% formaldehyde solution in which 1 to 2% of calcium lactate or 0.1 to 0.8% of sodium formate or 0.1% to 1% of sodium oxalate is dissolved, the said silk being then further treated as above.

The function of the "addition substance", alkali or salts (most of those mentioned having a slight alkaline reaction, either in cold or hot water) is to act as a protective agent to the artificial silk during the subsequent heating operation. The salts employed are of a non-acid character thereby distinguishing from the substances used in the Eschalier process above mentioned. The term "artificial silk" as used herein, is intended to include both the fine filaments and also coarser filaments such as "staple fibers" etc.

In this specification and in the claims thereof, the expression "alkali-forming metal" is intended to embrace both alkali metals (sodium, potassium) and alkaline earth metals (calcium, magnesium, etc.).

I claim:

1. A process of improving artificial silk composed essentially of hydrated cellulose which comprises treating the same with formaldehyde and with a non-acid compound of an alkali-forming metal of a concentration incapable of injuring the artificial silk, and thereafter heating the so treated artificial silk, to temperatures between about 120 and 170° C.

2. A process of improving artificial silk composed essentially of hydrated cellulose, which comprises treating the same with formaldehyde and with a non-acid salt of alkali-forming metal with an organic acid, such salt being capable of exercising a protective effect and of a concentration incapable of injuring the artificial silk, and thereafter heating the so treated artificial silk, to temperatures between about 120 and 170° C.

3. A process of improving artificial silk composed essentially of hydrated cellulose, which comprises treating the same with formaldehyde and with a non-acid compound of an alkali-forming metal of a concentration incapable of injuring the artificial silk, and thereafter heating the so treated artificial silk, to temperatures between about 140 and 150° C.

4. A process of improving artificial silk composed essentially of hydrated cellulose, which comprises impregnating the same in an aqueous solution containing formaldehyde and a plurality of non-acid compounds of an alkali-forming metal of a concentration incapable of injuring the artificial silk and thereafter heating the so treated artificial silk, to temperatures between 120 and 170° C.

5. A process of improving artificial silk composed essentially of hydrated cellulose, which comprises immersing the same in an aqueous solution containing formaldehyde and a non-acid compound of an alkali-forming metal of a concentration incapable of injuring the artificial silk, removing the excess of such aqueous solution from such artificial silk and thereafter heating the so treated artificial silk to a temperature high enough to render the same more resistant to water than is the untreated artificial silk.

6. A method of improving artificial silk which comprises the step of treating the same with an aqueous liquid containing formaldehyde and an alkali metal formate.

7. A method of improving artificial silk which comprises the step of treating the same with an aqueous liquid containing formaldehyde and an alkali metal formate and thereafter heating the said artificial silk to about 140 to 150° C.

8. A process of improving artificial silk composed essentially of hydrated cellulose, which comprises treating the same with formaldehyde and with a salt of an alkali-forming metal with a weak acid, which salt is of a somewhat alkaline character, and which salt is capable of exercising a protective effect and of a concentration incapable of injuring the artificial silk, and thereafter heating the so treated artificial silk, to temperatures between about 120 and 170° C.

In testimony whereof I affix my signature.

HANS KARPLUS.